United States Patent [19]

Wegner et al.

[11] Patent Number: 5,649,122
[45] Date of Patent: Jul. 15, 1997

[54] UNIVERSAL ASYNCHRONOUS RECEIVER/ TRANSMITTER WITH PROGRAMMABLE XON/XOFF CHARACTERS

[75] Inventors: Glenn A. Wegner; Art Khachaturian, both of San Jose, Calif.

[73] Assignee: Startech Semiconductor, Inc., San Jose, Calif.

[21] Appl. No.: 261,637

[22] Filed: Jun. 24, 1994

[51] Int. Cl.$^6$ ............................................. G06F 13/00
[52] U.S. Cl. ........................... 395/285; 395/286; 395/849
[58] Field of Search ........................ 395/325, 285, 395/286, 849

[56] References Cited

U.S. PATENT DOCUMENTS

| | | | |
|---|---|---|---|
| 4,949,333 | 8/1990 | Gulick et al. | 370/32 |
| 5,012,489 | 4/1991 | Burton et al. | 375/8 |
| 5,140,315 | 8/1992 | Edelson et al. | 340/728 |
| 5,140,679 | 8/1992 | Michael . | |
| 5,151,895 | 9/1992 | Vacon et al. | 370/85.1 |

*Primary Examiner*—Jack B. Harvey
*Assistant Examiner*—John Travis
*Attorney, Agent, or Firm*—Skjerven, Morrill, MacPherson, Franklin & Friel

[57] ABSTRACT

A UART compatible to a prior art UART provides a baud rate generator which can accept a higher frequency crystal oscillator to generate baud rates compatible with baud rates generated by the prior art UART without increasing the size of the frequency division circuit. In one embodiment, the UART of the present invention provides the capability for programmable flow control, including flow control for binary file transfers, using user-programmable multiple-character flow control words. In one embodiment, a sleep mode allows power conservation in the UART of the present invention.

7 Claims, 11 Drawing Sheets

| S3 S2 S1 | Address | ComPort | IRQ |
|---|---|---|---|
| 0 0 0 | 3F8-3FF | COM-1 | IRQB** |
| 0 0 1 | 2F8-2FF | COM-2 | IRQC** |
| 0 1 0 | 3E8-3EF | COM-3 | IRQB** |
| 0 1 1 | 2E8-2EF | COM-4 | IRQC** |
| 1 0 0 | 3F8-3FF | COM-1 | IRQA** |
| 1 0 1 | 2F8-2FF | COM-2 | IRQA** |
| 1 1 0 | 3E8-3EF | COM-3 | IRQA** |
| 1 1 1 | 2E8-2EF | COM-4 | IRQA** |

FIG. 2

| A2 | A1 | A0 | READ MODE | WRITE MODE |
|---|---|---|---|---|
| 0 | 0 | 0 | Receive Holding Register | Transmit Holding Register |
| 0 | 0 | 1 | Interrupt Status Register | Interrupt Enable Register |
| 0 | 1 | 0 | | FIFO Control Register |
| 0 | 1 | 1 | Line Control Register | Line Control Register |
| 1 | 0 | 0 | Modem Status Register | Modem Control Register |
| 1 | 0 | 1 | | |
| 1 | 1 | 0 | | |
| 1 | 1 | 1 | Scratchpad Register | Scratchpad Register |
| 0 | 0 | 0 | LSB of Divisor Latch | LSB of Divisor Latch |
| 0 | 0 | 1 | MSB of Divisor Latch | MSB of Divisor Latch |
| 0 | 1 | 0 | Enhanced Feature Register | Enhanced Feature Register |
| 1 | 0 | 0 | Xon-1 Word | Xon-1 Word |
| 1 | 0 | 1 | Xon-2 Word | Xon-2 Word |
| 1 | 1 | 0 | Xoff-1 Word | Xoff-1 Word |
| 1 | 1 | 1 | Xoff-2 Word | Xoff-2 Word |

FIG. 3

| BIT-5 | BIT-4 | FIFO trigger level |
|---|---|---|
| 0 | 0 | 16 |
| 0 | 1 | 8 |
| 1 | 0 | 24 |
| 1 | 1 | 30 |

FIG. 4a

| BIT-7 | BIT-6 | FIFO trigger level |
|---|---|---|
| 0 | 0 | 8 |
| 0 | 1 | 16 |
| 1 | 0 | 24 |
| 1 | 1 | 28 |

FIG. 4b

| BAUD RATE MCR BIT-7=1 | BAUD RATE MCR BIT-7=0 | 16 x CLOCK DIVISOR |
| --- | --- | --- |
| 50 | 200 | 2304 |
| 75 | 300 | 1536 |
| 150 | 600 | 768 |
| 300 | 1200 | 384 |
| 600 | 2400 | 192 |
| 1200 | 4800 | 96 |
| 2400 | 9600 | 48 |
| 4800 | 19.2K | 24 |
| 7200 | 28.8K | 16 |
| 9600 | 38.4k | 12 |
| 19.2K | 76.8k | 6 |
| 38.4K | 153.6k | 3 |
| 57.6K | 230.4k | 2 |
| 115.2K | 460.8k | 1 |

FIG. 5

| Cont-3 | Cont-2 | Cont-1 | Cont-0 | Tx, Rx software flow controls |
|---|---|---|---|---|
| 0 | 0 | X | X | No transmit flow control |
| 1 | 0 | X | X | Transmit Xon1, Xoff1 |
| 0 | 1 | X | X | Transmit Xon2, Xoff2 |
| 1 | 1 | X | X | Transmit Xon1 and Xon2 : Xoff1, Xoff2 |
| X | X | 0 | 0 | No receive flow control |
| X | X | 1 | 0 | Receiver compares Xon1, Xoff1 |
| X | X | 0 | 1 | Receiver compares Xon2, Xoff2 |
| 1 | 0 | 1 | 1 | Transmit Xon1, Xoff1. Receiver compares Xon1 or Xon2, Xoff1 or Xoff2 |
| 0 | 1 | 1 | 1 | Transmit Xon2, Xoff2 Receiver compares Xon1 or Xon2, Xoff1 or Xoff2 |
| 1 | 1 | 1 | 1 | Transmit Xon1 and Xon2 : Xoff1 and Xoff2 Receiver compares Xon1 and Xon2 : Xoff1 and Xoff2 |
| 0 | 0 | 1 | 1 | No transmit flow control Receiver compares Xon1 and Xon2 : Xoff1 and Xoff2 |

FIG. 8b

| P | D5 | D4 | D3 | D2 | D1 | D0 | Source of the interrupt |
|---|----|----|----|----|----|----|------------------------|
| 1 | 0 | 0 | 0 | 1 | 1 | 0 | LSR (Receiver Line Status Register) |
| 2 | 0 | 0 | 0 | 1 | 0 | 0 | RXRDY (Received Data Ready) |
| 2 | 0 | 0 | 1 | 1 | 0 | 0 | RXRDY (Receive Data time out) |
| 3 | 0 | 0 | 0 | 0 | 1 | 0 | TXRDY (Transmitter Holding Register Empty) |
| 4 | 0 | 0 | 0 | 0 | 0 | 0 | MSR (Modem Status Register) |
| 5 | 0 | 1 | 0 | 0 | 0 | 0 | RXRDY (Received Xoff Signal)/ Special character |
| 6 | 1 | 0 | 0 | 0 | 0 | 0 | CTS, RTS change of state |

FIG. 9

UNIVERSAL ASYNCHRONOUS RECEIVER/ TRANSMITTER WITH PROGRAMMABLE XON/XOFF CHARACTERS

BACKGROUND OF THE INVENTION

1. Field of the Invention

This invention relates to integrated circuit design; in particular this invention relates to the design of universal asynchronous receiver/transmitter (UART) integrated circuits.

2. Discussion of the Related Art

UARTs have been used in the past in input and output ports of a computer system to convert byte-parallel data received from a central process unit (CPU) of the computer system to serial data for transmission over a serial link. One example of a prior art UART is the NS16550, available from National Semiconductor Corporation. The NS16550 is described in detail in U.S. Pat. No. 5,140,679 to Michael, entitled "Universal Synchronous Receiver/Transmitter", issued on Aug. 18, 1992, and filed on Sep. 14, 1988. The disclosure of U.S. Pat. No. 5,140,679 is hereby incorporated by reference in its entirety as background information.

In the past, "software flow control" is established for ASCII transfer modes using the "XON" and "XOFF" characters, which are respectively assigned ASCII codes '11H and '13H, to indicate "start" and "stop" flow control. The term "software flow control" refers to the flow control mechanism in which flow control characters are embedded in the data stream. Under an ASCII transfer mode, the receiver sends an XOFF character to the transmitter when the number of characters in the receiver's first-in-first-out memory (FIFO), which contains data received from the transmitter, exceeds a pre-determined trigger level. Upon receiving the XOFF character, the transmitter suspends transmission after transmitting the current character and waits for an XON character from the receiver. When the number of characters in the receiver's FIFO falls below a second predetermined value, an XON character is sent by the receiver to the transmitter. Thereupon, the transmitter resumes transmission. Software flow control can be disabled by the CPU. Since excluding the XON and XOFF characters specifically and completely from the ASCII data stream is undesirable, to avoid an XON or XOFF character sent as data from being recognized as a control character, an "escape sequence" is used in the prior art. That is, when an XON or an XOFF character is to be sent to the transmitter as data, the sequence "ESC XON" or "ESC XOFF" is sent (ESC is the value '1BH A.K.). Under ASCII transfer mode, it is unlikely that the escape sequence ordered "packets". The size of each packet is defined by in the header section at the beginning of each packet. At the end of each packet is a CRC characteristic value, which is recomputed at the receiver. Should a loss of the transmitted data occur, such as resulting from an overflow at the receiver's FIFO, the loss of data would result in a mismatch in the computed CRC characteristic value in the receiver and the corresponding transmitted CRC characteristic value. When such a mismatch occurs, the higher level protocol in the CPU causes the packet in error to be retransmitted. However, under such protocol, not only are packet retransmissions time consuming, such protocols require CPU cycles. Hence, binary data transfer operations in the prior art UARTs are highly inefficient.

In the NS16550 UART, a baud rate generator provides as output a clock signal which is 16 times a user-selected baud rate. To generate the output clock signal, the frequency of a 1.8432 MHz crystal is divided using a 16-bit divisor to achieve baud rates ranging from 50–115.2 KHz. However, as modems of higher speeds are becoming more available, the range of baud rates required by these modems include baud rates higher than 115.2KHz. Thus, to generate a higher baud rate, a higher frequency crystal is required as a time base. However, many existing applications can still be economically provided using the NS1655. Thus, a method to extend the range of supported baud rates without requiring extensive software and hardware modifications in the UART is desired.

In the prior art, UARTs are powered at all times. However, many applications today require low power or battery-powered operation. In those low power operations, it is desirable to provide a method for powering down a UART when data is not actively being transmitted or received. It is also desirable that a powered down a UART can be automatically activated when data arrives at the UART to be either received or transmitted.

SUMMARY OF THE INVENTION

In accordance with a first aspect of the present invention, a programmable circuit for flow control is provided. The programmable flow control circuit includes (i) a receive signal line for receiving serial data input; (ii) a transmit signal line for providing serial data output; (iii) first and second control signal lines for receiving, respectively, first and second control signals; (iv) third and fourth control signal lines for providing, respectively, third and fourth control signals; (v) a first register containing a first set of two user-programmable control characters, the first set of two user-programmable control characters representing a command to suspend transmission of serial data; (vi) a second register containing a second set of two user-programmable control characters, the second set of two user-programmable control characters representing a command to resume transmission of serial data; and (vi) a control circuit, which is coupled to the receive signal line, the transmit signal line, the first, second, third and fourth control signal lines, and the first and second registers, for (a) transmitting one or more characters of the first set of two user-programmable characters on the transmit signal line, when the first control signal is received on the first control signal line; (b) transmitting one or more characters of the second set of two user-programmable characters on the transmit signal line, when the second control signal is received on the second control signal line; (iii) asserting the third control signal, when one or more characters of the first set of two user-programmable characters are received on the receive signal line; and (iv) asserting the fourth control signal, when one or more characters of the second set of two user-programmable characters are received on the receive signal line.

In one embodiment of the programmable circuit for flow control, the control circuit includes a programmable selection circuit for (i) specifying whether one or more characters of each of the first and second sets of two user-programmable characters are to be used in generating the third and fourth control signals, and (ii) specifying whether programmable flow control is to be enabled in each of the receive and transmit signal lines. Thus, in accordance with this first aspect of the present invention, a UART of the present invention provides programmable flow control even for binary data transfers. Since the flow control characters are programmable, an input file can be scanned for one or more two-character sequences not present in the binary file to be used as flow control characters. These two-character sequences are loaded in special registers in the UART prior to the binary data transfer.

In accordance with a second aspect of the present invention, a control circuit is provided in a universal asynchronous receiver-transmitter (UART) circuit, which includes a clock generator circuit. The control circuit includes: (a) a counter circuit receiving a clock signal, a reset signal, and a datum representing a time interval, the counter circuit performing the tasks of: (i) loading the datum as a count value upon receiving the reset signal, (ii) updating the count value at each subsequent transition of said clock signal, and (iii) asserting a control signal when the count value equals a predetermined value; (b) a detector circuit which is coupled to provide the counter circuit with the reset signal, the detector circuit asserting the reset signal when one of a plurality of predetermined conditions is detected; and (c) a power circuit, which is coupled to receive the control signal and coupled to the clock generator circuit of the UART, the power circuit enabling said clock generator circuit when the control signal is deasserted, and disabling the clock generator circuit when the control signal is asserted.

Thus, in accordance with this second aspect of the present invention, sleep mode can be automatically activated after a predetermined time interval upon detection of the confluence of many predetermined conditions, and automatically deactivated when one of those predetermined conditions no longer exist.

In accordance with a third aspect of the present invention, a circuit is provided for increasing the number of clock frequencies generated by a baud rate generator. Such a circuit includes (i) an input circuit for receiving an external reference clock signal, and for providing a first internal reference clock signal having a first frequency derived from the external reference clock signal; (ii) a frequency division circuit, which is coupled to receive the first internal reference clock signal, for generating a second internal reference clock signal having a second frequency which is a predetermined sub-multiple of the first frequency; (iii) a control signal line for receiving a control signal; (iv) a multiplexer circuit, which receives the first and second internal reference clock signals and the control signal, for providing a third internal reference clock signal, the third internal reference clock signal having a third frequency selected from the first and second frequencies of the first and second internal reference clock signals, according to the state of the control signal; and (v) means for coupling the baud rate generator to the multiplexer, such that the baud rate generator receives the third internal reference clock signal and generates a baud rate having a frequency which is a sub-multiple of the third frequency.

Thus, in accordance with this third aspect of the present invention, a UART of the present invention can generate baud rates compatible to those generated by a UART in the prior art, as well as new baud rates, using substantially the same frequency divisors as those used in the prior art UART, and without unduly increasing the size of the frequency division circuit.

The present invention is better understood upon consideration of the detailed description below and the accompanying drawings.

BRIEF DESCRIPTION OF THE DRAWINGS

FIG. 2 shows the eight possible combinations of port address, COMM port and interrupt request line assignments selectable by setting the logic values of signals S0–S2 under PC mode.

FIG. 3 shows the assignments of address bits A0–A2 to register selections and software flow control character accesses.

FIGS. 4a and 4b show the selectable trigger levels" in the transmit and receive FIFO, respectively, at which an interrupt is generated to the CPU.

FIG. 5 shows the baud rates generated at the $\overline{\text{BAUDOUT}}$ output terminal of a UART of the present invention, when a 7,372 MHz crystal is used as reference input signal.

FIG. 8b shows the software flow control schemes available in this embodiment, ranging from no flow control in both transmit and receive to full 2-byte matching software flow control in both transmit and receive.

FIG. 9 shows the six priority interrupts of the present embodiment, and the corresponding bit values on data bus D0–D7, when the interrupt is generated.

DETAILED DESCRIPTION OF THE PREFERRED EMBODIMENTS

Figure 1A:
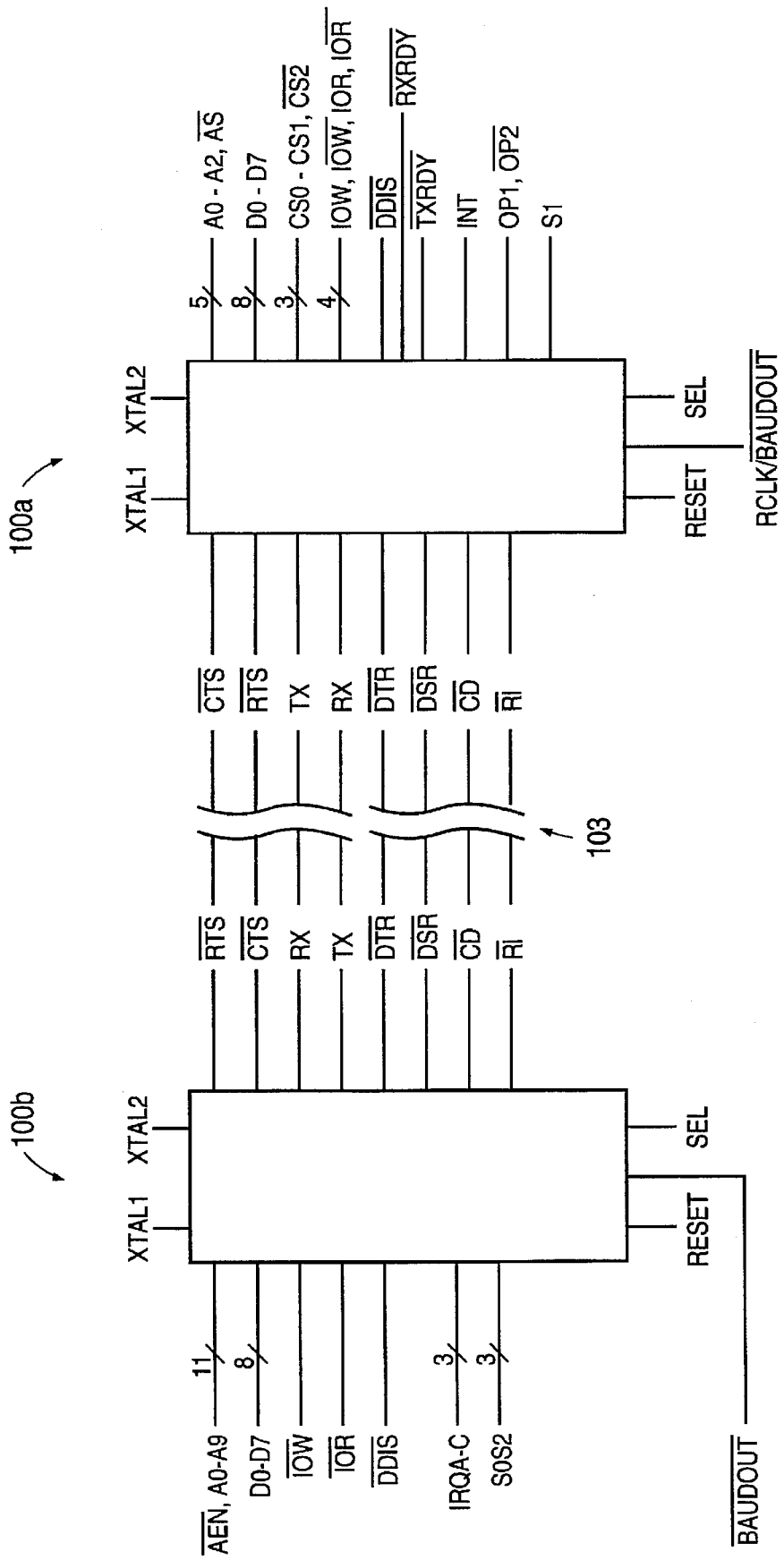
FIG. 1a shows a UART 101a of the present embodiment in the STD mode and a UART 101b of the present embodiment in the PC mode, provided respectively in two computer systems 100a and 100b.

An embodiment of the present invention can be used in either of the two configurations 101a and 101b shown in FIG. 1a, in accordance with the present invention. Since the present embodiment is pin-compatible with the NS16550, to simplify the present description, common operational and functional characteristics shared by the NS16550 and the present embodiment are not described here.

The present embodiment can operate either in the standard mode ("STD" mode), or the "PC" mode. Under the STD mode, a UART of this embodiment is pin-compatible with the NS16550 device discussed in the background of the invention section. Under the PC mode, the UART of the present embodiment receives a 10-bit port address, which is internally mapped to the communication ports COM1–COM4 and interrupt levels IRQ3 and IRQ4, IRQx. Thus, under the PC mode, the need for external port address decoding is eliminated.

FIG. 1a shows a UART 101a of the present embodiment in STD mode and a UART 101b of the present embodiment in the PC mode provided, respectively, in two computer systems 100a and 100b. As shown in FIG. 1a, computer systems 100a and 100b are connected through a communication channel 103, which may include, for example, modems and telephone lines or RS232 connections known in the art. In the present embodiment, the logic state of signal SEL selects between STD mode and PC mode. In either PC or STD mode, signal RESET initializes the internal states of UART 101a and UART 101b. The functions of serial port signals $\overline{\text{RTS}}$ ("ready to sent"), $\overline{\text{CTS}}$ ("clear to send"), $\overline{\text{DTR}}$ ("data terminal ready"), $\overline{\text{DSR}}$ ("data send request"), $\overline{\text{CD}}$ ("carrier detect"), $\overline{\text{RI}}$ ("ring detect indicator") , TX ("transmit"), and RX ("receive") are well-known in the art. In either STD or PC mode, parallel data arrives from the central processing unit "CPU", not shown) at an 8-bit data bus D0–D7, signalled by the CPU asserting an active state of signal $\overline{IOW}$. Alternatively, parallel data are latched from UART 101b after the CPU asserts an active state of $\overline{IOR}$. A signal $\overline{DDIS}$ is provide to disable an external transceiver when the CPU reads UART 101a or UART 101b. In either PC or STD mode, an external crystal oscillator is connected across the terminals XTAL1 and XTAL2 to provide a time base for the UART.

Under PC mode, UART 101b receives a 10-bit port address A0–A9, which are the lower 10 bits of CPU's address bus. This port address is set in UART 101b by the logic states of signals S0–S2. FIG. 2 shows the 10-bit port address, the communication port ("COMM" port), and the interrupt request line assignments corresponding to the eight possible values of signals S0–S2. An interrupt to the CPU is generated on the selected one of lines IRQA–IRQC, in accordance with the logic state of signals S0–S2. The CPU interrupt request ("IRQ") lines are mapped to UART 101b's IRQA–IRQC lines by external connections. Under PC mode, the $\overline{BAUDOUT}$ output terminal provides a clock signal having a frequency equal to 16 times a specified baud rate. The address lines A0–A2 are used to address one of ten internal registers. (Since the receive holding register ("RHR") and the transmit holding register ("THR") are read-only and write-only, respectively, the RHR and the THR share the same address, distinguished only by whether $\overline{IOW}$ or $\overline{IOR}$ is asserted. Similarly, since the FIFO control register ("FCR") and the interrupt status register ("ISR") are also respectively write-only and read-only, the FCR and the ISR share the same address). By toggling bit-7 of the line control register ("LCR"), an additional three internal registers are addressed by address lines A0–A2. In addition, address bits A0–A2 are also used to read and write, when bit-7 of the LCR is set, software flow control characters, as discussed in further detail below. FIG. 3 shows the assignments of address bits A0–A2 to register selections and software flow control character accesses.

Under STD mode, the port address of UART 101a is decoded externally and interrupt to the CPU is generated on line INT, which is mapped externally to the selected IRQ line. An address strobe signal is used to strobe into UART 101a the logic states of address lines A0–A2, which selects one of thirteen internal registers and read and write access to registers containing the software flow control characters, as mentioned above. In addition, three chip select signals CS0–CS1 and $\overline{CS2}$ are provided to allow selection of one of eight UARTs. Two signals TXRDY and $\overline{RXRDY}$ are asserted when the transmit first-in-first-out buffer (FIFO) and the receiver FIFO are full, respectively. Two user programmable output signals $\overline{OP1}$ and $\overline{OP2}$ are provided as user-defined output terminals.

In this embodiment, because the PC mode and the STD mode require different signals, some of the pins used in the PC mode are not used in the STD mode. Thus, many pins can be shared. For example, in this embodiment, mode pin S2 (PC mode) is shared with input clock signal RCLK (STD mode), and address pin A5 (PC mode) is shared with chip select pin CS0 (STD mode).

In the present embodiment, the following internal registers are provided: (i) a receive holding register ("RHR"), (ii) a transmit holding register ("THR"), (iii) an interrupt enable register ("IER"), (iv) a FIFO control register ("FCR"), (v) an interrupt status register ("ISR"), (vi) a line status register ("LCR"), (vii) a modem control register ("MCR"), (viii) a line status register ("LSR"), (ix) a modem status register ("MSR"), (x) a scratchpad register ("SCR"), (xi) a divisor latch register, lower byte ("DLL"), (xii) a divisor latch register, upper byte ("DLM"), and (xiii) an enhanced feature register ("EFR").

In this embodiment, the RHR and the THR each hold an 8-bit datum to be placed on or latched from data bus D0–D7. The datum in the RHR is transferred from the receive FIFO and the datum in the THR is to be transferred to the transmit FIFO. In sequence, at the output end of the transmit FIFO, each byte of the transmit FIFO is loaded into a transmit shift register for serial output. Likewise, a receive shift register receives a serial bit stream and loads the receive FIFO in sequence a character at a time. In this embodiment, both the transmit and receive FIFOs, each having a capacity of 32 characters, are internal to the UART of the present embodiment. These FIFOs can operate either in a "polled mode", or an "interrupt mode". Under the polled mode, defined by resetting IER bits 0 to 3 and setting FCR bit 0, the status of the receive and transmit FIFOs can be read from the LSR. LSR bit 0 indicates that at least one character is in the receive FIFO. LSR bit 5 indicates that the transmit FIFO is empty. LSR bit 6 indicates that both the transmit FIFO and the transmit shift register are empty. LSR Bit 7 indicates an error is detected in the receive FIFO, and an error code is simultaneously provided in LSR bits 1 to 4.

Under the interrupt mode, which is defined by setting FCR bit 0 and IER bit 0, a receive data interrupt is generated to the CPU when a predetermined number of bytes of received data ("receiver FIFO trigger level") are present in the receive FIFO. Likewise, an interrupt is generated when the transmit data in the transmit FIFO exceeds a predetermined number of bytes ("transmit FIFO trigger level"). The trigger levels of the transmit and receive FIFOs are defined by FCR bits 4 to 5 and FCR bits 6 to 7 respectively. FIGS. 4a and 4b show the selectable number of bytes of data ("trigger levels") in the transmit and receive FIFO, respectively, at which an interrupt is generated to the CPU. As explained above, when at least one received character is in the receive FIFO, LSR bit 0 is set.

In this embodiment, the LCR is used to specify the data format for asynchronous communication. In particular, LCR bits 0–1 specify the word length for each serially transmitted or received character or word. This word length can be any word length between 5–8 bits long, inclusive. LCR bit 2 specifies the number of stop bits framing the transmitted or received character. If LCR bit 2 is reset, one stop bit is specified for all word lengths. If LCR bit 2 is set, 1.5 stop bits is specified for 5-bit words, and 2 stop bits are specified for any of the 6- to 8bit words. LCR bit 3 and LCR bit 5 specify, respectively, whether a parity bit to be generated or detected and whether odd or even parity is used. When LCR bit 3 and LCR bit 5 are set, a forced parity format is specified, i.e. the parity bit of each received or transmitted character is forced to '1'for odd parity, and forced to '0' for even parity. LCR bit 6, when set, causes a break condition (i.e. a predetermined time interval of logic low in the TX output line) to be transmitted. As mentioned above, LCR bit 7 is set when an access to any one of the EFR, and the DLM and DLL registers is desired.

In this embodiment, the MCR controls an interface between the UART of the present embodiment with a modem or a peripheral device (e.g. an RS-232 device). MCR bits 0–5 are used to specify, respectively, the logic states of $\overline{DTR}$, $\overline{RTS}$, $\overline{OP1}$, $\overline{OP2}$, a diagnostic "loop-back" mode, and selects a 3-state or an open-source interrupt output. MCR Bit 6 is not used. MCR bit 7, when EFR bit 4 is set, is used to extend the range of baud rates generated by an UART of the present invention when a 7.372 MHz crystal is used. In accordance with the present invention, the same frequency divider circuit can be used to generate all baud rates from 50 Hz to 115.2 KHz generated by the prior art 1.8432 MHz crystal, and additional baud rates from 200 Hz to 460.8 KHz. FIG. 5 shows the baud rates generated at the $\overline{\text{BAUDOUT}}$ output terminal of a UART of the present invention, when a 7,372 MHz crystal is used as a reference input clock signal. As shown in FIG. 5, when MCR bit-7 is set, the same set of frequency divisors as used in a prior art NS16550 UART (these frequency divisors shown in column 501 of FIG. 5) are used to generate the same baud rates, shown in column 503, generated in a prior art NS16550 UART. In addition, additional baud rates, ranging from 200 Hz to 460.8 KHz are generated when MCR bit-7 is set. As in the prior art, the frequency divisor values are stored in two 8-bit registers DLM and DLL. The present invention not only achieves higher baud rates than the prior art, the present invention also allows the use of prior art divisor values and thereby achieving the higher baud rates without requiring a frequency division circuit of greater complexity resulting from the larger number of divisor values.

Figure 6:
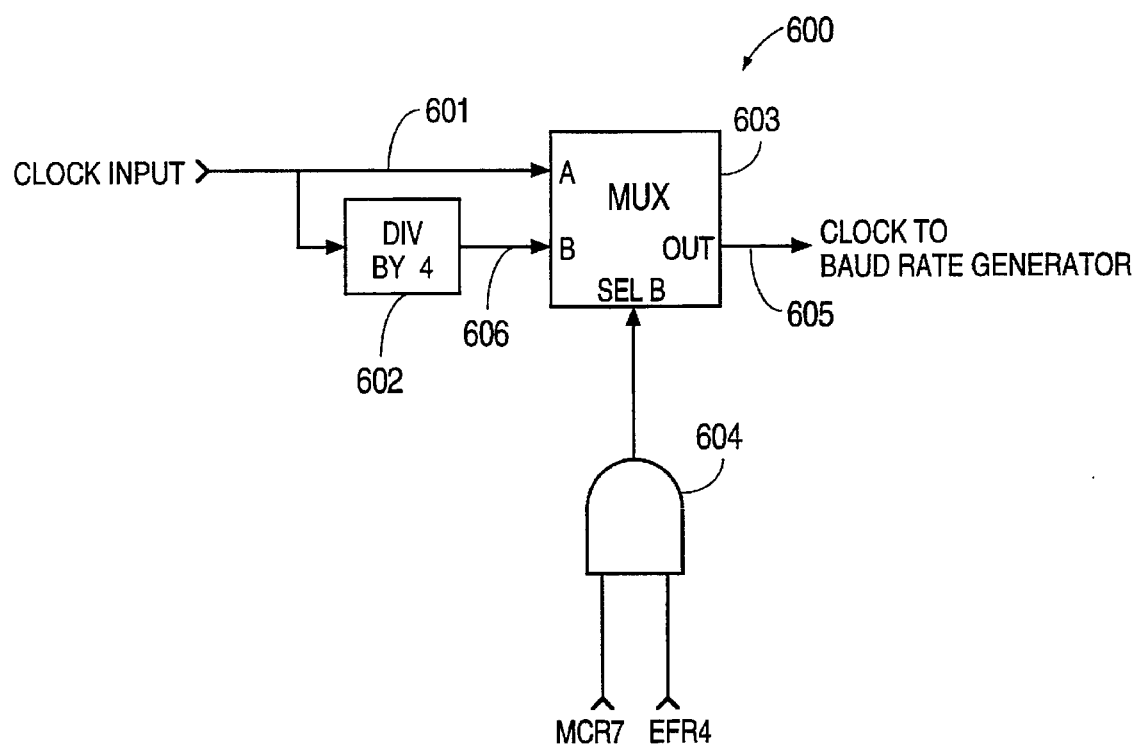
FIG. 6 shows an implementation 600 of the frequency divisor in accordance with the present invention.

FIG. 6 shows an implementation 600 of the frequency divisor in accordance with the present invention. As shown in FIG. 6, an input clock signal on lead 601, which is derived from a conventional crystal oscillator (e.g. a 7,372 MHz crystal provided across the input leads XTAL1 and XTAL2 of FIG. 1), is provided simultaneously to the input terminals of a multiplexer 603 and a conventional divide-by-4 frequency division circuit 602. The output signal of frequency division circuit 602, which has ¼ the frequency of the input signal on lead 601, is provided on lead 606 as an input signal to multiplexer 603. Multiplexer 603 is controlled by the output signal of AND gate 604, which has MCR bit 7 and EFR bit 4 as input signals. When MCR bit 7 and EFR bit 4 are set, multiplexer 603 selects as the output signal on lead 605 the output signal of divide-by-4 frequency division circuit 602 provided on lead 606.

The IER enables various types of interrupts to be generated to the CPU. IER bits 0 to 3 enable "receiver ready", "transmitter empty" and "receiver line status" and "modem status register" interrupts, respectively. Receiver line status interrupts and modem status register interrupts are discussed in further detail below. IER bit 4 enables or disables "sleep mode", which is discussed in further detail below. IER bits 5–7 enable software and hardware interrupts, which are also discussed in further detail below.

In the present embodiment, sleep mode is enabled by setting both IER bit 4 and EFR bit 4. Under sleep mode, the power consumption of a UART of the present invention is reduced substantially by disabling the external clock or oscillator circuit and powering down the UART, except for the logic circuits which detect the conditions for which the UART resumes normal activities. In the present embodiment, a UART of the present invention enters sleep mode after four character times of no activity in the UART. Activity in the UART is defined by any of the following: (i) an active external reset signal, (ii) data received in the receive holding register or receive FIFO (i.e. LSR bit 0 is set), (iii) data in the transmit FIFO or transmit holding register (i.e. LSR bit 6 is reset), (iv) a start bit is detected in the serial data input (i.e. a start bit is detected on the RX line), and (v) any change in the 8-bit word of the MSR.

Figure 7:
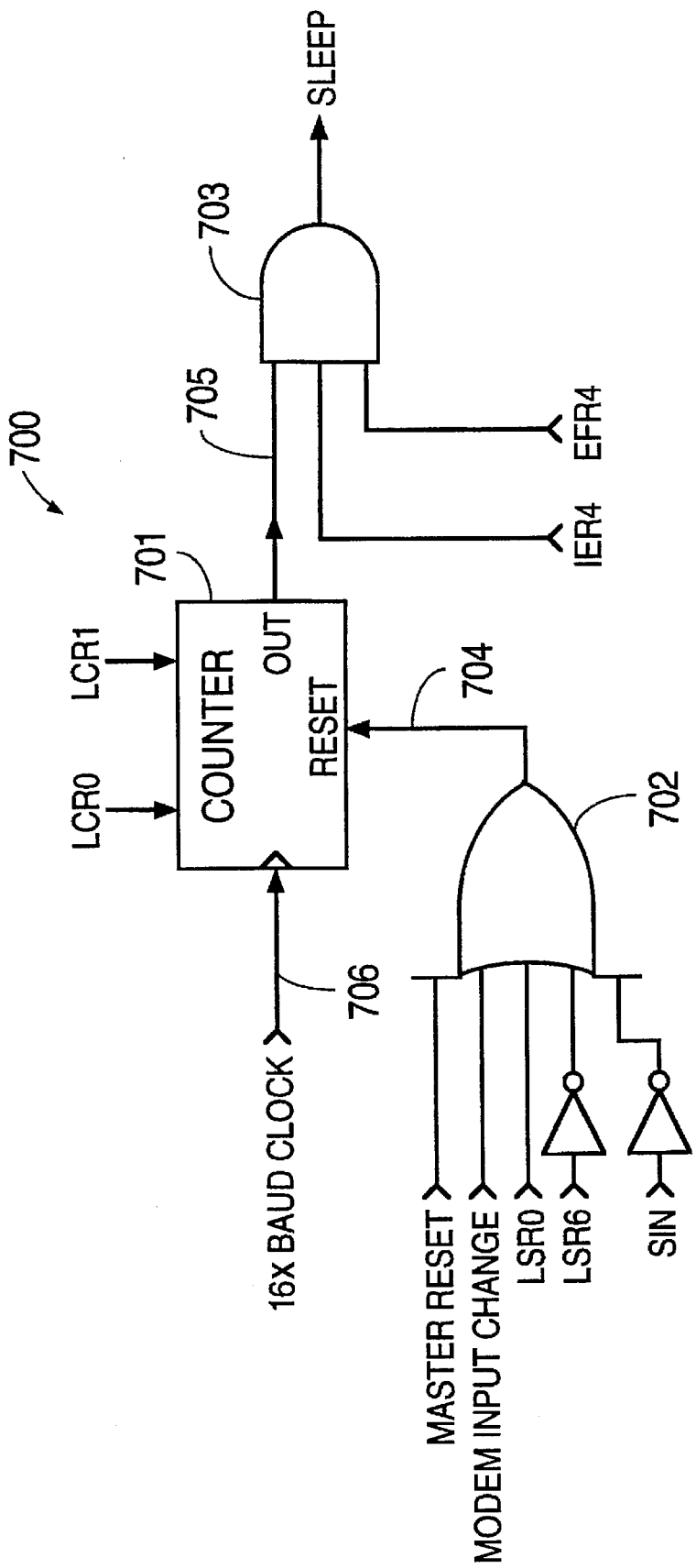
FIG. 7 shows an implementation 700 of the sleep mode logic in accordance with the present invention.

FIG. 7 shows an implementation 700 of the sleep mode logic in accordance with the present invention. As shown in FIG. 7, a 10-stage up-counter 701 is initially held in reset state by a reset signal on lead 704. The conditions under which the reset signal on lead 704 is asserted is discussed above. When the reset signal on lead 704 is inactive, up-counter 701 increments at transitions of a clock signal on lead 706. This clock signal on lead 706 is generated by the baud rate generator discussed above, and has a frequency equal to 16 times the selected baud rate. Up-counter 701 asserts an output signal "out" on lead 705 upon reaching a predetermined count value, which is defined by LCR bits 0 to 1. In this embodiment, the count value is proportional to the serial word length of each incoming character. LCR bits 0 to 1 defines one of four word lengths between 5–8, inclusive. When the count value in counter 701 reaches this predetermined count value, the logic state of the signal at output terminal 705 goes to logic high. The output logic signal SLEEP, which is used to initiate powering down of the UART and the external clock or oscillator circuit, is generated by AND gate 703 in conjunction with IER bit 4 and EFR bit 4. As explained above, IER bit 4 and EFR bit 4 together enable the sleep mode. Because of the presence of parity bits and stop bits, the actual time between deasserting the reset signal and up-counter 701 reaching the count value, varies between 3.4 to 4.6 word lengths.

In the embodiment, both hardware flow control and software flow control are provided. Hardware flow control interrupts are enabled by IER bits 0 ($\overline{\text{CTS}}$ interrupt) and 1 ($\overline{\text{RTS}}$ interrupt). When the received data in receive FIFO reaches the predetermined trigger value, the $\overline{\text{RTS}}$ signal is forced inactive, to prevent further characters be sent to the UART. The $\overline{\text{RTS}}$ signal is reset when the received data in receive FIFO falls below a second predetermined value. Transmission is halted after complete transmission of the current character, when $\overline{\text{CTS}}$ is deasserted. Transmission is resumed when $\overline{\text{CTS}}$ is active. In this embodiment, this second predetermined value is the next lower trigger level selectable.

Software flow control interrupt is provided in the present invention by loading into two 8-bit "XON" registers two user-programmable "XON" flow control characters XON1 and XON2; and into two 8-bit "XOFF" registers two user-programmable "XOFF" flow control characters XOFF1 and XOFF2. In the present embodiment, the XON1, XON2, XOFF1, and XOFF2, characters are read and written when LCR bit 7 is set. The assignments for the XON and XOFF registers with respect to address bits A0–A2 are shown in FIG. 3 referenced above. In addition, the present invention provides great flexibility with respect to the use of these user-programmable XON or XOFF control characters. FIG. 8b shows the software flow control schemes selectable in this embodiment, ranging from no flow control in either transmit and receive operations to full 2-byte matching software flow control in both transmit and receive operations. The software flow control scheme is selected by the 4-bit value of EFR bits 0 to 3.

For example, by setting all EFR bits 0 to 3, 2-byte software flow control is selected in both transmit and receive operations. In accordance with the present invention, a UART of the present invention monitors the received data for two consecutive words in the received data exactly matching the user-programmable XOFF flow control characters stored in the XOFF registers. When such a match occurs, transmission is suspended after the current word in the transmit shift register is transmitted and an interrupt to the CPU is generated. Transmission is resumed, when two consecutive words in the received data exactly matching the user-programmable XON user-specified control characters stored in the XON registers are received. Further, the user-programmable XOFF control characters are transmitted when the received data current residing in the receive FIFO equals or exceeds a first predetermined trigger level. The user-programmable XON control characters are sent when the data currently residing in the receive FIFO falls below a second predetermined trigger lever lesser than the first predetermined trigger level.

Figure 8A:
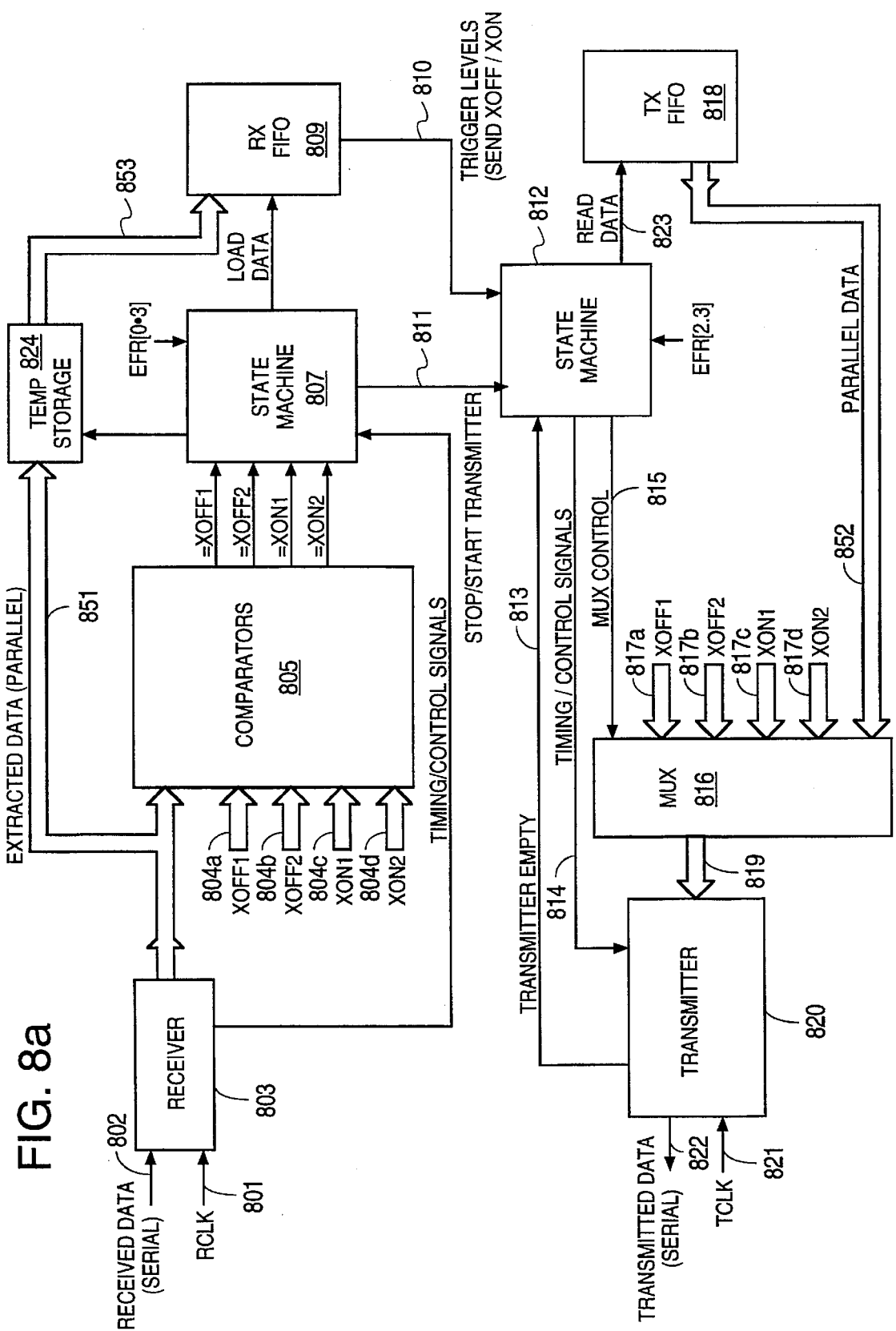
FIG. 8a shows an implementation 800 of a logic circuit for software flow control, in accordance with the present invention.

FIG. 8a shows an implementation (circuit 800) of a logic circuit for software flow control, in accordance with the present invention. As shown in FIG. 8a, in circuit 800, data is received into receiver 803 over a serial line 802, which is timed by a clock signal RCLK at terminal 801. The serial data received is converted to parallel (single character wide) and placed on parallel bus 851. The data on parallel bus 851 is latched into temporary storage register 824 and compared in comparator 805 to the user-programmable flow control characters XOFF1, XOFF2, XON1, and XON2 on lines 804a–804d, respectively, to provide output control signals =XOFF1, =XOFF2, =XON1, and =XON2 on lines 806a–806d. The output control signals =XOFF1, =XOFF2, =XON1, and =XON2 represent, respectively, that the data on parallel bus 851 match the XOFF1, XOFF2, XON1, and XON2 characters on lines 804a–804d. A state machine 807, which is sequenced by the timing in receiver 803, determines whether the data parallel bus 851 should be loaded into receive FIFO 809. State machine 807 determines, in accordance with the selected flow control condition specified in EFR bits 0–3, whether a flow control sequence is received. If state machine 807 determines that a flow control sequence is received, the start/stop signal on lead 811 is accordingly asserted or deasserted to indicate whether transmission should be halted or resumed. If a flow control sequence is not received, state machine 807 asserts the control signal on lead 808 to load into receive FIFO 809 the data on parallel bus 853, which is the output data of temporary storage register 824. Temporary storage register 824 allows circuit 800 to look ahead from parallel bus 851 the second character of a two-character flow control sequence.

The start/stop transmitter control signal on lead 811 is provided to a second state machine 812, which controls and sequences transmitter 814. In addition, control signals on leads 801 are also received into state machine 812. The control signals on leads 810 indicate whether receive FIFO 809 contains a number of received characters exceeding a first predetermined trigger level (XOFF condition), or receive FIFO 809 contains a number of received character less than a second predetermined trigger level (XON condition). In accordance with the states of either control signals (i.e. control signals on leads 810 and 811), state machine 812, in accordance with the flow control condition specified by EFR bits 2 and 3, insert the appropriate flow control sequence into data stream transmitted by transmitter 820. Insertion of the appropriate flow control sequence, or selection of normal transmit data is accomplished by setting the control signals on leads 815 to multiplexer 816, which receives as input the transmit character from transmit FIFO 818 on parallel bus 852, and the user-programmable flow control characters XOFF1, XOFF2, XON1, and XON2 on leads 817a–817d, respectively. Transmitter 820 is controlled and sequenced by state machine 812 via control leads 814. The transmitted data is provided serially on lead 822. When transmitter 820 is empty, the control signal on lead 813 is asserted. In response to the assertion of this control signal on lead 813, state machine 812 asserts the read data control signal on lead 823 to retrieve the next transmit character from transmit FIFO 818. The retrieved transmit character is placed on parallel bus 852.

As shown in FIG. 8b, the user can select for software flow control either one-character XON/XOFF or 2-character XON/XOFF flow control. In addition, the transmit and receive flow control mechanisms can be determined independently. Thus, by selecting and writing the user-programmable XON and XOFF control characters into the XON and XOFF registers prior to transmission, and selecting one of the software flow control schemes, flow control can now be provided in binary data transfers.

The IER bits 0–7 enable respectively "receiver ready interrupt", "transmitter empty interrupt", "receiver line status interrupt", "modem status interrupt", "sleep mode", "receive XOFF interrupt", "RTS interrupt" and "CTS interrupt". Each of these interrupt operations have been discussed above. ISR bit 0, at logic "0", indicates that an interrupt is pending. ISR bits 1–5 indicate which of the six priority interrupts is pending as the currently highest priority interrupt. FIG. 9 shows, under the column labelled "P", the six priority interrupts of the present embodiment and, under the columns labelled "DO" through "D5", the corresponding bit values on data bus D0–D5, when the interrupt is generated. ISR bit 4 indicates that an matching XOFF control characters have been received. ISR bit 5 indicates that active states of $\overline{\text{CTS}}$ and $\overline{\text{RTS}}$ have been received or issued. The FCR bit 0 enables the receive and transmit FIFOs. The FCR bits 1 to 2 clear, respectively, the contents of the receive and transmit FIFOs and reset their respective counters. The FCR bit 3 toggles the $\overline{\text{RXRDY}}$ and $\overline{\text{TXRDY}}$ (received data ready and transmit ready flags) between "mode 1" and "mode 0". Under mode 0, $\overline{\text{RXRDY}}$ becomes active when the receive FIFO contains at least one received datum, and $\overline{\text{TXRDY}}$ becomes active when no transmit character is in the transmit FIFO or the transmit holding register. Under mode 1, however, $\overline{\text{RXRDY}}$ becomes active when a predetermined trigger level or a time out is reached, and $\overline{\text{TXRDY}}$ becomes inactive when the transmit FIFO is completely full. FCR bits 4–5 and FCR bits 6 and 7 set transmit and receive FIFO predetermined trigger levels, respectively, as shown in FIG. 4a and 4b.

The LSR bits 0 to 7 provide the status of data transfer between the CPU and a UART of the present embodiment. LSR bit 0 indicates that received data is available either in the received holding register or the receive FIFO. LSR bits 1 to 7 indicate, respectively, the conditions "overrun error", "parity error", "framing error", "break condition received", "transmit holding register empty" and "transmit holding and shift registers empty"and "at least one parity error, framing error or break condition".

The MSR bits 0–7 indicate the current state of the control lines between the UART to the modem or peripheral device. MSR bits 0–3 indicate, respectively, whether the logic states of $\overline{\text{CTS}}$, $\overline{\text{DSR}}$, $\overline{\text{RI}}$, and $\overline{\text{CD}}$ are changed since the last read operation to the MSR. A read access to MSR clears MSR bits 0–3. The MSR bits 4 to 7 are provided to indicate the logic values of $\overline{\text{RTS}}$, $\overline{\text{DTR}}$, $\overline{\text{OP1}}$, and $\overline{\text{OP2}}$ during the local loopback mode, which is primarily used in diagnostic of the UART.

As discussed above, EFR bits 0 to 3 select which one of the software flow control schemes is used. EFR bit 4 enables IER bits 4–7, FCR bits 4–5, MCR bits 5 and 7, and ISR bits 4–5. EFR bit 5 enables a special interrupt mode when a received character matches the user-programmable XOFF character XOFF2. EFR bits 6 to 7 enables hardware flow control (i.e $\overline{\text{RTS}}$ and $\overline{\text{CTS}}$ flow control).

Figure 1B:
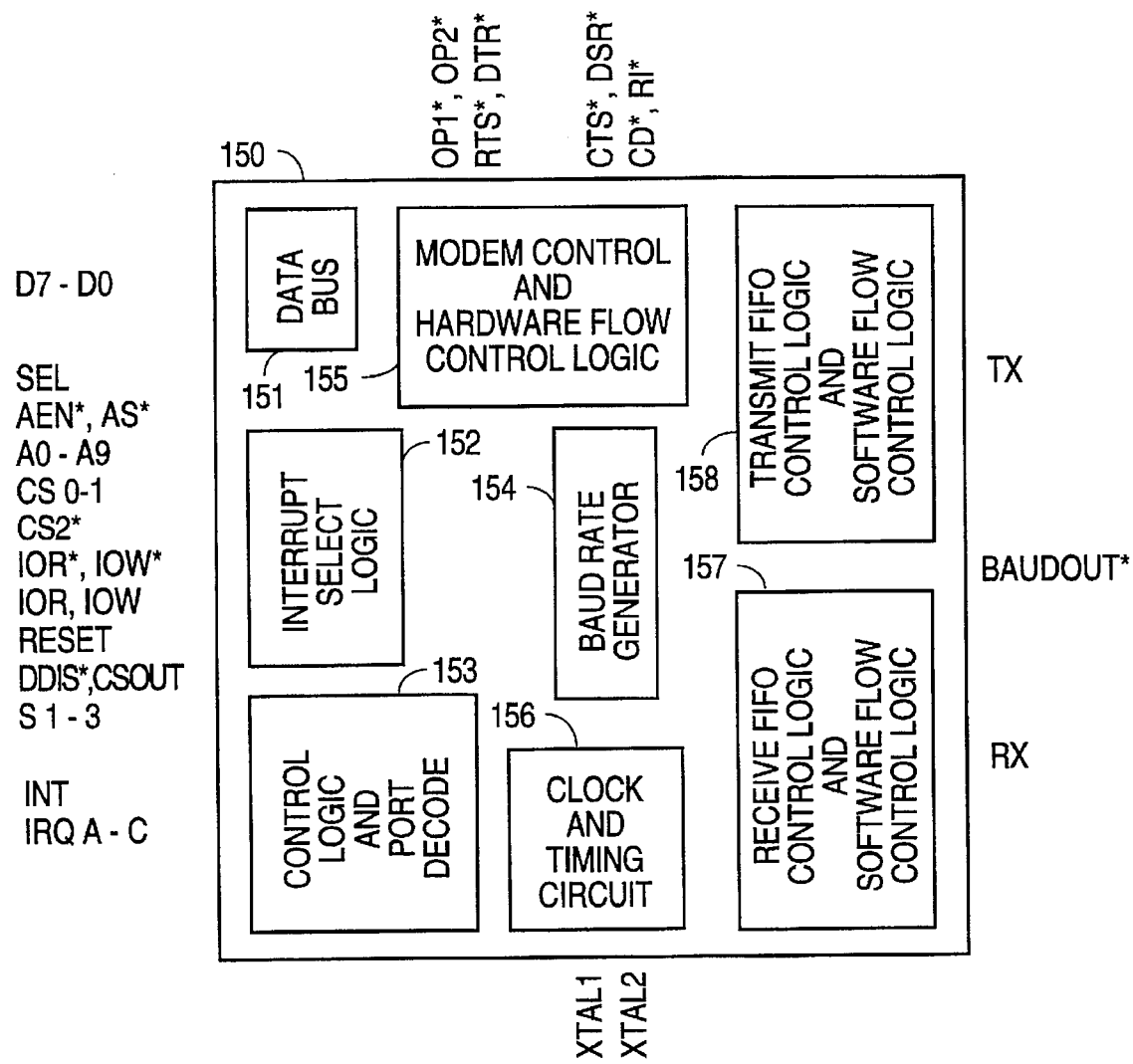
FIG. 1b shows a block diagram 150 of an integrated circuit implementation of a UART of the present invention.

FIG. 1b shows a block diagram 150 of an integrated circuit implementation of an UART of the present invention. As shown in FIG. 1b, an integrated circuit 150 includes (i) a data bus circuit 151 for receiving and providing data on data bus D0–D7; (ii) an interrupt select logic 152 for selecting and prioritizing interrupts for the CPU to service; (iii) control logic and port decode circuit 153 for handling address decoding for register selection, for controlling the sleep mode, and for handling the interface with the CPU; (iv) a clock and timing circuit 156 for receiving a reference frequency clock signal from an external crystal oscillator and for generating clock signals to be used throughout integrated circuit 150; (v) baud rate generator 154 for generating the desired baud rate, including frequency division, for output on the $\overline{\text{BAUDOUT}}$ output terminal; (vi) modem and hardware flow control circuit 155 for controlling the signal interface, including hardware flow control using the $\overline{\text{CTS}}$ and $\overline{\text{RTS}}$ signals, with an external modem or peripheral device; (vii) receive FIFO control circuit 157, which also includes a software flow control circuit for the receiver; and (viii) transmit FIFO control circuit 158, which also includes a software flow control circuit for the transmitter. Receive FIFO control circuit 157 and transmit FIFO control circuit 158 include the transmit and receiving holding and shift registers and the transmit and receive FIFOs. Control logic and port decode circuit 153 includes internal registers IER, FCR, LCR, MCR, LSR, MSR, and SPR. Interrupt select circuit 152 includes the internal register ISR.

The above detailed description are provided to illustrate the specific embodiments of the present invention and is not intended to be limiting. Numerous variations and modifications are possible within the scope of the present invention. The present invention is set forth in the following claims.

We claim:

1. A programmable circuit for flow control, comprising:
    a receive signal line for receiving serial data input;
    a transmit signal line for providing serial data output;
    first and second control signal lines for receiving, respectively, first and second control signals;
    third and fourth control signal lines for providing, respectively, third and fourth control signals;
    a first register containing a first set of two user-programmable characters, said first set of two user-programmable characters forming a first two-character control sequence, said two-character control sequence representing a command to suspend data transmission of serial data;
    a second register containing a second set of two user-programmable characters, said second set of two user-programmable characters forming a second two-character control sequence, said second two-character control Sequence representing a command to resume transmission of serial data; and
    a control circuit, coupled to said receive signal line, said transmit signal line, said first, second, third and fourth control signal lines, and said first and second registers, for (i) transmitting said first set of two user-programmable characters as said first two-character control sequence on said transmit signal line, when said first control signal is received on said first control signal line; (ii) transmitting said second set of two user-programmable characters as said second two-character control sequence on said transmit signal line, when said second control signal is received on said second control signal line; (iii) asserting said third control signal, when said first set of two user-programmable characters are received in said first two-character control sequence on said receive signal line; and (iv) asserting said fourth control signal, when said second set of two user-programmable characters are received in said second two-character control sequence on said receive signal line.

2. A programmable circuit for flow control as in claim 1, wherein said control circuit comprises a programmable selection circuit for (i) specifying whether or not said first and second two-character control sequence are to be used in generating said third and fourth control signals, and (ii) specifying whether programmable flow control is to be enabled in each of said receive and transmit signal lines.

3. A method for programmable flow control, comprising:
    receiving serial data in a receive signal line;
    transmit serial data in a transmit signal line;
    containing in a first register a first set of two user-programmable characters, said first set of two user-programmable characters forming a first two-character control sequence representing a command to suspend data transmission of serial data;
    containing in a second register a second set of two user-programmable characters, said second set of two user-programmable characters forming a second two-character control sequence representing a command to resume transmission of serial data; and
    transmitting said first set of two user-programmable characters as said first two-character control sequence on said transmit signal line, when a first control signal is received on a first control signal line;
    transmitting said second set of two user-programmable characters as said second two-character control sequence on said transmit signal line, when a second control signal is received on a second control signal line;
    asserting a third control signal, when said first set of two user-programmable characters are received in said first two-character control sequence on said receive signal line; and
    asserting a fourth control signal, when said second set of two user-programmable characters are received in said second two-character control sequence on said receive signal line.

4. A method for programmable flow control as in claim 3, further comprises the steps of, in a programmable selection circuit, (i) specifying whether of or not said first and second two-character control sequences are to be used in generating said third and fourth control signals, and (ii) specifying whether programmable flow control is to be enabled in each of said receive and transmit signal lines.

5. A circuit for providing software flow control, comprising:
    a receiver for receiving over a first communication line a first string of characters;
    a transmitter for sending over a second communication line a second string of characters;
    a register for storing a first character in said first string of characters;
    a comparator for comparing a second character in said first string of characters, said second character being the character following said first character in said first string of characters, to a character of each of a set of user-programmable two-character control sequences;
    a state machine generating a first control signal indicating receipt of one of said user-programmable two-character control sequence, when two successive successful comparisons in said comparators occur; and means for inserting a two-character control sequence in said second string of characters for transmission in said transmitter.

6. A circuit as in claim 5, wherein said means for inserting comprises:

a multiplexor receiving as input data said second string of characters and said set of predetermined two-character control sequence, said multiplexor selecting an output word to said transmitter from said input data; and a state machine for generating control signals to select said output word, in accordance with said first control signal.

7. A circuit as in claim 5, wherein said means for inserting receives as an input a second control signal, indicating whether data in a first-in-first-out memory exceeds a predetermined threshold.

* * * * *

UNITED STATES PATENT AND TRADEMARK OFFICE
CERTIFICATE OF CORRECTION

PATENT NO.    : 5,649,122
DATED         : July 15, 1997
INVENTOR(S)   : Wegner, Glenn A.; Khachaturian, Art It is certified that error appears in the above-identified patent and that said Letters Patent is hereby corrected as shown below:

Col. 1, line 50, after "sequence" insert --ESC XON or ESC XOFF is required as data, since ESC is an unviewable or unprintable character on a terminal or printer.
However, in a binary data transfer, even the escape sequences occur frequently as data. Thus, in the prior art, for binary data transfers, the CPU typically disables software flow control prior to beginning each data transfer. Instead, data integrity is ensured by higher level protocols, such as cyclic redundancy checks ("CRC"). In one popular protocol, for example, binary data are sent in fixed-format--

Col. 2, line 59, "Thus" should begin a new paragraph.

Col. 7, line 24, delete "7,372" and insert --7.372--.

Signed and Sealed this

Twentieth Day of January, 1998

Attest:

BRUCE LEHMAN

*Attesting Officer*            Commissioner of Patents and Trademarks